United States Patent
Kim et al.

(10) Patent No.: US 9,818,046 B2
(45) Date of Patent: Nov. 14, 2017

(54) DATA CONVERSION UNIT AND METHOD

(71) Applicant: LG Display Co., Ltd., Seoul (KR)

(72) Inventors: Sung Jin Kim, Goyang-si (KR); Jun Woo Jang, Goyang-si (KR); Sun Hee Park, Seoul (KR); Soo Yeon Jung, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 74 days.

(21) Appl. No.: 14/887,146

(22) Filed: Oct. 19, 2015

(65) Prior Publication Data

US 2016/0125622 A1    May 5, 2016

(30) Foreign Application Priority Data

Nov. 3, 2014    (KR) .................. 10-2014-0151024

(51) Int. Cl.
| | |
|---|---|
| *G09G 3/34* | (2006.01) |
| *G06K 9/62* | (2006.01) |
| *G06K 9/46* | (2006.01) |
| *H04N 5/202* | (2006.01) |
| *G09G 3/36* | (2006.01) |
| *G06T 5/00* | (2006.01) |

(Continued)

(52) U.S. Cl.
CPC ......... *G06K 9/6267* (2013.01); *G06K 9/4652* (2013.01); *G06K 9/4661* (2013.01); *G06T 5/009* (2013.01); *G09G 3/3648* (2013.01); *H04N 5/202* (2013.01); *H04N 9/67* (2013.01); *H04N 9/77* (2013.01); *G09G 2300/0452* (2013.01); *G09G 2340/06* (2013.01)

(58) Field of Classification Search
CPC .. G06K 9/4652; G06K 9/4661; G06K 9/6267; G06T 5/009; G09G 2300/0452; G09G 2340/06; G09G 3/3648; H04N 5/202; H04N 9/67; H04N 9/77
USPC .................................................. 345/690–691
See application file for complete search history.

(56) References Cited

U.S. PATENT DOCUMENTS

| | | |
|---|---|---|
| 2005/0219274 A1 | 10/2005 | Yang et al. |
| 2006/0274212 A1 | 12/2006 | Lo et al. |
| 2008/0137159 A1 | 6/2008 | Lim |

(Continued)

FOREIGN PATENT DOCUMENTS

| | | |
|---|---|---|
| CN | 1808559 A | 7/2006 |
| CN | 101009851 A | 8/2007 |

(Continued)

OTHER PUBLICATIONS

European Patent Office, Search Report and Opinion, European Patent Application No. 15192540.1, dated Feb. 3, 2016, eight pages.

(Continued)

*Primary Examiner* — Tony Davis
(74) *Attorney, Agent, or Firm* — Fenwick & West LLP

(57) ABSTRACT

Embodiments relate to a data conversion unit including a color analysis portion configured to determine based on R (red), G (green) and B (blue) data signals among the R, G, B data signals and W (white) data signal for an input image whether or not the input image includes a pure color component; and a brightness adjustment portion configured to adjust brightness of the W data signal according to a hue of the pure color component included in the input image.

12 Claims, 9 Drawing Sheets

(51) Int. Cl.
*H04N 9/67* (2006.01)
*H04N 9/77* (2006.01)

(56) References Cited

U.S. PATENT DOCUMENTS

| | | | |
|---|---|---|---|
| 2009/0046307 A1 | 2/2009 | Kwak et al. | |
| 2011/0096249 A1* | 4/2011 | Belik | G09G 3/3413 348/791 |
| 2011/0149069 A1* | 6/2011 | Ishii | G06K 9/4652 348/135 |
| 2013/0241810 A1* | 9/2013 | Higashi | G09G 3/3406 345/77 |
| 2014/0285539 A1* | 9/2014 | Kurokawa | G09G 3/3406 345/690 |
| 2015/0002552 A1* | 1/2015 | Takagi | G09G 3/2003 345/690 |
| 2015/0109356 A1* | 4/2015 | Yata | G09G 3/2003 345/691 |
| 2016/0125622 A1* | 5/2016 | Kim | H04N 5/202 345/690 |
| 2017/0061903 A1* | 3/2017 | Yata | G09G 3/3413 |

FOREIGN PATENT DOCUMENTS

| | | |
|---|---|---|
| CN | 103325351 A | 9/2013 |
| JP | 2009-048166 A | 3/2009 |
| KR | 101172399 B1 | 8/2012 |

OTHER PUBLICATIONS

Chinese Office Action, Chinese Patent Application No. 201510729562.4, dated Sep. 8, 2017, 17 pages.

* cited by examiner

DATA CONVERSION UNIT AND METHOD

CROSS-REFERENCE TO RELATED APPLICATION

The present application claims priority under 35 U.S.C. §119(a) of Republic of Korea Patent Application No. 10-2014-0151024 filed on Nov. 3, 2014, which is hereby incorporated by reference in its entirety.

BACKGROUND

Field of the Disclosure

The present application relates to data conversion unit and method.

Description of the Related Art

Display devices can display various types of image data captured by a still photo or digital video camera, obtained from a still photo archive, generated through software application, or received through one of broadcast or streaming medium. The display devices can be integrated with a variety of electrical appliances. For example, the display devices can be integrated with desktop computers, laptop computers, computer workstations, personal digital assistants, mobile devices such as mobile phones, wireless communication devices, multimedia devices, exclusive viewing stations such as cameras and television receivers. Also, the display devices can be combined with the other electrical appliances. In other words, the display devices can be applied to a variety of electrical appliances. Such display devices can include liquid crystal display (LCD) devices, cathode ray tube (CRT) display devices, plasma display devices, projection display devices, organic light emitting diode display devices and so on.

Recently, the display devices are being developed to realize high image quality and reduce power consumption through increment of brightness. Meanwhile, the display device not only displays a color image using three primary colors including red, green and blue colors but also realizes peak brightness using the red, green and blue colors. In other words, the white color must depend on the red, green and blue colors. As such, it is difficult for desired brightness of the white color to control brightness of the red, green and blue colors. Particularly, it is more difficult for the LCD display device to increase brightness due to transmittance of liquid crystal.

To address this matter, a display device using white sub-pixels was developed. However, when an image including a pure color component is displayed on the, the contrast ratio of the image becomes lower due to white brightness. As such, image quality deteriorates.

BRIEF SUMMARY

Accordingly, embodiments of the present application are directed to data conversion unit and method that substantially obviate one or more of problems due to the limitations and disadvantages of the related art.

The embodiments relate to provide data conversion unit and method which are adapted to increase brightness by adding white pixel data.

Also, the embodiments relate to provide data conversion unit and method which are adapted to independently control brightness of white data signal.

Moreover, the embodiments relate to provide data conversion unit and method which are adapted to differently reduce the white brightness of an input image according to pure colors and prevent deterioration of image quality, by differently controlling the degree of brightness reduction of a white data signal of the input image on the basis of quantity and hue (or kind) of a pure color component included in the input image.

Furthermore, the embodiments relate to provide data conversion unit and method which are adapted to realize a high contrast ratio without increasing brightness of backlight.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

A data conversion unit according to an aspect of the present embodiment includes: a color analysis portion configured to determine based on R (red), G (green) and B (blue) data signals among the R, G, B data signals and W (white) data signal for an input image whether or not the input image includes a pure color component; and a brightness adjustment portion configured to adjust brightness of the W data signal according to a hue of the pure color component included in the input image.

In the data conversion unit according to an aspect of the present embodiment, the color analysis portion can include a hue distribution analyzer configured to compares a first reference value and a saturation of each pixel of the input image which is obtained from the RGB data signals.

The data conversion unit according to an aspect of the present embodiment can allow the color analysis portion to further include a hue distribution quantity analyzer which compares a second reference value and the number of pixels having the saturations of at least the first reference value.

The data conversion unit according to an aspect of the present embodiment can enable the hue distribution quantity analyzer to determine that the input image includes the pure color component, when the number of pixels is at least the second reference value.

In the data conversion unit according to an aspect of the present embodiment, the brightness adjustment portion can include a maximum hue analyzer configured to not only divide the pixels, which have the saturations of at least the first reference value, into hues but also distinguish a hue including a largest number of pixel.

Also, in the data conversion unit according to an aspect of the present embodiment, the brightness adjustment portion can further include a brightness adjustment coefficient establisher configured to set a brightness adjustment coefficient, which is used to adjust the brightness of the W data signal, in accordance with the determined hue.

A data conversion method according to an aspect of the present embodiment can include: determining based on R (red), G (green) and B (blue) data signals among the R, G, B data signals and W (white) data signal for an input image whether or not the input image includes pure color components; distinguishing a hue of the pure color component having a maximum ratio from the pure color components; and a brightness adjustment portion configured to adjust brightness of the W data signal according to the hue of the maximum ratio.

In the data conversion method according to another aspect of the present embodiment, the determination for the pure color components within the input image can include: analyzing saturation for each pixel on the input image; determining whether or not the saturation of each pixel is at least a first reference value; and determining whether or not the number of pixels having the saturations of at least the first reference value is at least a second reference value.

Also, in the data conversion method according to another aspect of the present embodiment, the determination of the hue having the maximum ratio can include: dividing the pixels, which have the saturations of at least the first reference value, into hues; and distinguishing a hue of a maximum ratio among the hues including the pixels of at least the first reference value.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings.

DETAILED DESCRIPTION OF THE EMBODIMENTS

Figure 1:
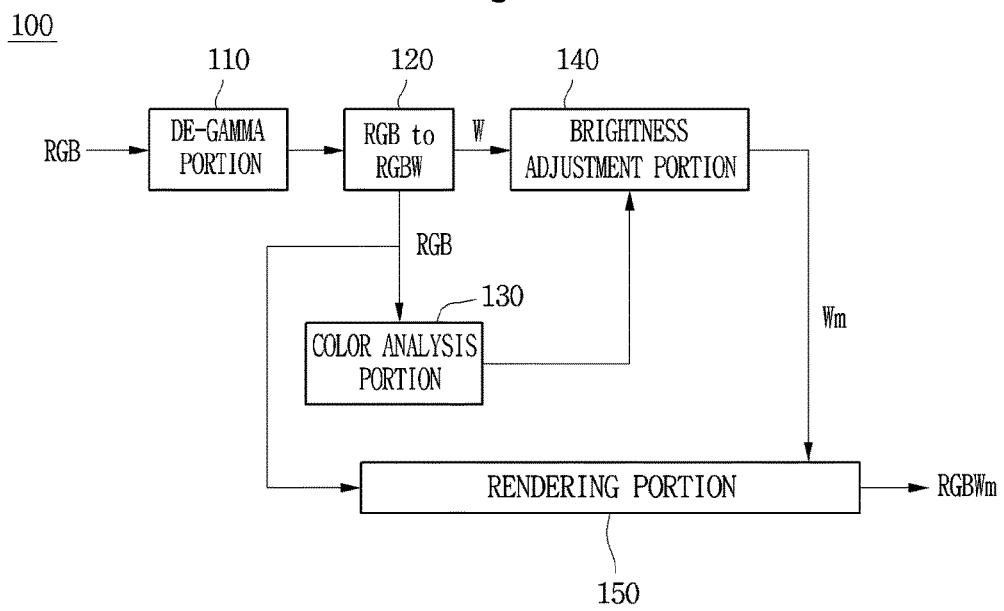
FIG. 1 is a block diagram showing a data conversion unit according to a first embodiment of the present disclosure.

Reference will now be made in detail to data conversion unit and method in accordance with the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. In the drawings, the size, thickness and so on of a device can be exaggerated for convenience of explanation. Wherever possible, the same reference numbers will be used throughout this disclosure including the drawings to refer to the same or like parts.

Example First Embodiment

FIG. 1 is a block diagram showing a data conversion unit 100 according to a first embodiment of the present disclosure. The data conversion unit 100 can receive red (hereinafter, "R"), green (hereinafter, "G") and blue (hereinafter, "B") data signals, and transform the input R, G and B data signals into R, G, B and white (hereinafter, "W") data signals. Also, the data conversion unit 100 can analyze the transformed R, G and B data signals and adjust the W data signal on the basis of the analyzed resultant. Moreover, the data conversion unit 100 can output the transformed R, G and B data signals and the adjusted W data signal. To this end, the data conversion unit 100 can include a de-gamma portion 110, a RGB to RGBW (hereinafter, "RGB-RGBW") transformation portion 120, a color analysis portion 130, a brightness adjustment portion 140 and a rendering portion 150, as shown in FIG. 1.

In one embodiment, the data conversion unit 100 includes a processor and a memory (non-transitory computer readable storage medium). The de-gamma portion 110, a RGB to RGBW (hereinafter, "RGB-RGBW") transformation portion 120, a color analysis portion 130, a brightness adjustment portion 140 and a rendering portion 150 may be embodied as software modules stored in the memory in conjunction with the processor.

The de-gamma portion 110 can receive RGB data signals of image data and perform a de-gamma treatment for the input RGB data signals in a frame unit. Also, the de-gamma portion 110 can performs a bit-stretch treatment for the de-gamma-treated RGB data signals. More specifically, the de-gamma portion 110 compensates for an inverse gamma, which is included in the input RGB data signals, through the de-gamma treatment. As such, the (de-gamma)-treated RGB signals can have a linear property. Also, the de-gamma portion 110 can increase the de-gamma-treated RGB data signals in the number of bits through the bit stretch treatment. Accordingly, the generation of bit overflow phenomena at data operations performed for converting the RGB data signals into the RGBW data signals can be prevented. Such a de-gamma portion 110 can simultaneously perform the de-gamma treatment and the bit stretch treatment using a de-gamma LUT (look-up-table).

The RGB-RGBW transformation portion 130 can convert the RGB data signals, which are applied from the de-gamma portion 110, into RGBW data signals. The RGBW data signals obtained by the RGB-RGBW transformation portion 130 are used to drive a display panel including RGBW sub-pixels. In order to reduce power consumption without changing color coordinates, the RGB-RGBW transformation portion 130 can add a W data signal using RGB data components, which are based on measured or estimated values having the same brightness and color coordinate as a W data component, and perform subtractions of the RGB data components from the (de-gamma)-treated RGB data signals. For example, the RGB-RGBW transformation portion 130 can generate the W data signal by extracting one of a common gray scale value, which is represented by following equation (1), and a minimum gray scale value represented by equation (2) from the (de-gamma)-treated RGB data signal. Also, the RGB-RGBW transformation portion 130 can generate secondary RGB data signals by subtracting the W data signal from each of the (de-gamma)-treated RGB data signals.

$$W=\mathrm{Com}(R,G,B) \quad \text{Equation (1)}$$

$$W=\mathrm{Min}(R,G,B) \quad \text{Equation (2)}$$

In another different manner, the RGB-RGBW transformation portion 130 can convert R, G and B data signals into four color data signal (including R, G, B and W data signals) using data conversion methods which are based on properties of each sub-pixel such as a brightness property of the sub-pixel and a driving property of the sub-pixel. In this case, the RGB-RGBW transformation portion 130 can convert the RGB data signals into the RGBW data signals using data conversion methods which are disclosed in Korean patent publication nos. 10-2013-0060476 and 10-2013-0030598, which are incorporated by reference herein in their entirety.

For the convenience of explanation, the (de-gamma)-treated RGB data signals being input to the RGB-RGBW transformation portion 130 will be referred to as "primary RGB data signals" and the RGB data signals of the RGBW data signals being output from the RGB-RGBW transformation portion 130 will be referred to as "transformed RGB data signals".

The color analysis portion 130 can input the transformed RGBW data signals as shown in the drawing. Alternatively, the color analysis portion 130 can receive either the (de-gamma)-treated RGB data signals from the de-gamma portion 110 or original input RGB data signals which are used as input signals of the de-gamma portion 110, even though it is not shown in the drawing. Also, the color analysis portion 130 can analyze color distribution using the RGB data signals. In detail, the color analysis portion 130 can analyze the saturation of an input image using the input RGB data signals and determine based on the analyzed saturation of the input image whether or not the input image includes a pure color component. Meanwhile, the saturation means a hue quantity in an arbitrary color or a color purity which is varied along the progression from a white color to a gray color. As such, the saturation of a color can become higher as the color is closed to a light spectrum which is mixed with any one of white and black colors. In other words, the saturation represents a purity of a color or the degree of a pure color diluted by white light. As such, it can be determined through the saturation analysis of an input image whether or not the input image includes a pure color component.

The brightness adjustment portion 140 inputs the transformed W data signal from the RGB-RGBW transformation portion 120. Also, the brightness adjustment portion 140 can adjust the brightness of the transformed W data signal on the basis of the analyzed resultant of the color analysis portion 130.

The rendering portion 150 can combine the transformed RGB data signals, which are applied from the RGB-RGBW transformation portion 120, with the adjusted W data signal which is applied from the brightness adjustment portion 140. As such, combined RGBW data signals can be output from a rendering portion 150. Also, the rendering portion 150 can enhance definition by reproducing a new pixel using at least two pixels.

Meanwhile, the data conversion unit 100 can further include a gamma portion (not shown). The gamma portion can perform a gamma treatment for the transformed RGBW data signals in a frame unit. The gamma-treated RGBW signals can have a non-linear property.

Example Second Embodiment

Figure 2:
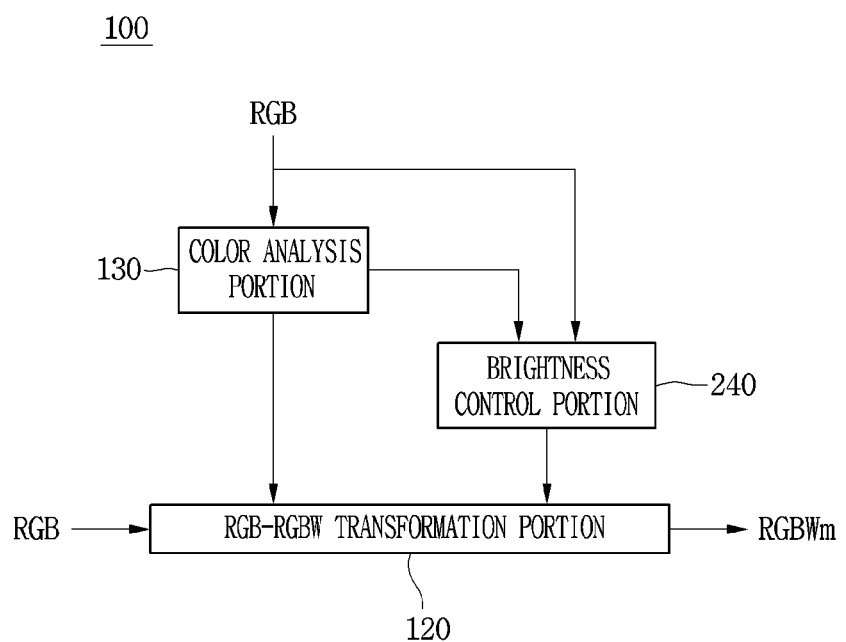
FIG. 2 is a block diagram showing a data conversion unit according to a second embodiment of the present disclosure.

FIG. 2 is a block diagram showing a data conversion unit 100 according to a second embodiment of the present disclosure. Referring to FIG. 2, the data conversion unit 100 according to a second embodiment of the present disclosure can include a RGB-RGBW transformation portion 120, a color analysis portion 130 and a brightness control portion 240.

The color analysis portion 130 can input RGB data signals for an input image. Also, the color analysis portion 130 can analyze saturation of the input image using the input RGB data signals and determine whether or not the input image corresponds to a pure color image. If it is determined that the input image corresponds to a color composite image which has a complex color distribution unlike the pure color image, the color analysis portion 130 can supply the RGB-RGBW transformation portion 120 with the determined (or analyzed) result for the input image. On the contrary, when it is determined that the input image corresponds to the pure color image, the color analysis portion 130 can apply a brightness control signal to the brightness control portion 240.

If the brightness control signal is applied from the color analysis portion 130, the brightness control portion 240 can distinguish the hue of the pure color component which is included in the input image. Also, the brightness control portion 240 can generate a brightness adjustment coefficient in accordance with the distinguished hue. The brightness adjustment coefficient is applied from the brightness control portion 240 to the RGB-RGBW transformation portion 120. For example, the adjusted brightness is obtained by multiplying the unadjusted brightness with the brightness adjustment coefficient.

The RGB-RGBW transformation portion 120 can receive either the color analysis result of the color analysis portion 130 or the brightness adjustment coefficient of the brightness control portion 240. If the analyzed result indicating the color composite image is applied from the color analysis portion 130, the RGB-RGBW transformation portion 120 can transform the input RGB data signals into RGBW data signals without additionally adjusting the W data signal. On the contrary, when the brightness adjustment coefficient is applied from the brightness control portion 240, the RGB-RGBW transformation portion 120 can not only transform the input RGB data signals into the RGBW data signals but also adjust the brightness of the transformed W data signal using the brightness adjustment coefficient. As such, the transformed RGBW data signal with the brightness which is differently adjusted according the hues can be output.

Example Third Embodiment

Figure 3:
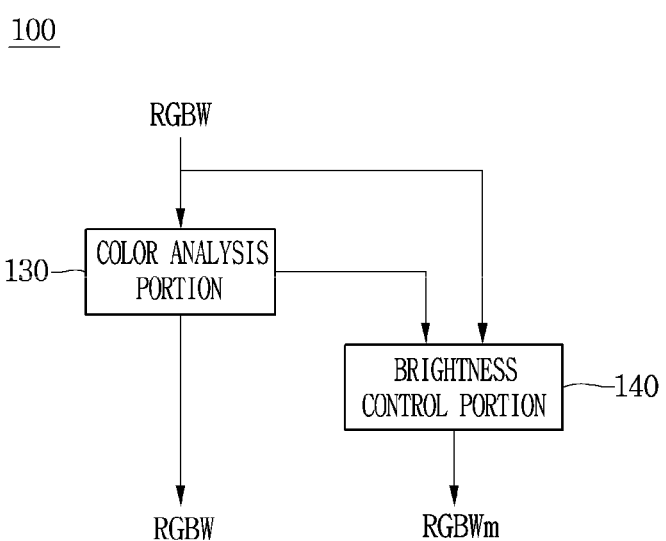
FIG. 3 is a block diagram showing a data conversion unit according to a third embodiment of the present disclosure.

FIG. 3 is a block diagram showing a data conversion unit 100 according to a third embodiment of the present disclosure. Referring to FIG. 3, the data conversion unit 100 according to a third embodiment of the present disclosure can include a color analysis portion 130 and a brightness adjustment portion 140.

The color analysis portion 130 can input RGBW data signals for an input image. Also, the color analysis portion 130 can determine on the basis of the RGB data signals among the input RGBW data signals whether the input image is a pure color image close to a pure color or a color composite image with a complex color distribution. If it is determined that the input image corresponds to the color composite image, the color analysis portion 130 can output the input RGBW data signals as they are. On the contrary, the color analysis portion 130 can output a brightness control signal to the brightness adjustment portion 140, when the input image is the pure color image which is the same as or close to the pure color.

The brightness adjustment portion 140 can receive the RGBW data signals for an input image. Meanwhile, the brightness adjustment portion 140 can selectively receive the brightness control signal. If the brightness control signal is applied from the color analysis portion 130, the brightness adjustment portion 140 detects (or selects) a hue with the maximum frequency number on the basis of the brightness control signal. In other words, the brightness adjustment portion 140 can determine which of the several hues has the highest ratio. Also, the brightness adjustment portion 140 can set a brightness adjustment coefficient in accordance with the hue of the maximum frequency number. Moreover, the brightness adjustment portion 140 adjusts the brightness of the W data signal using the brightness adjustment coefficient. As such, the brightness-adjusted RGBW data signals can be output from the brightness adjustment portion 140.

Figure 4:
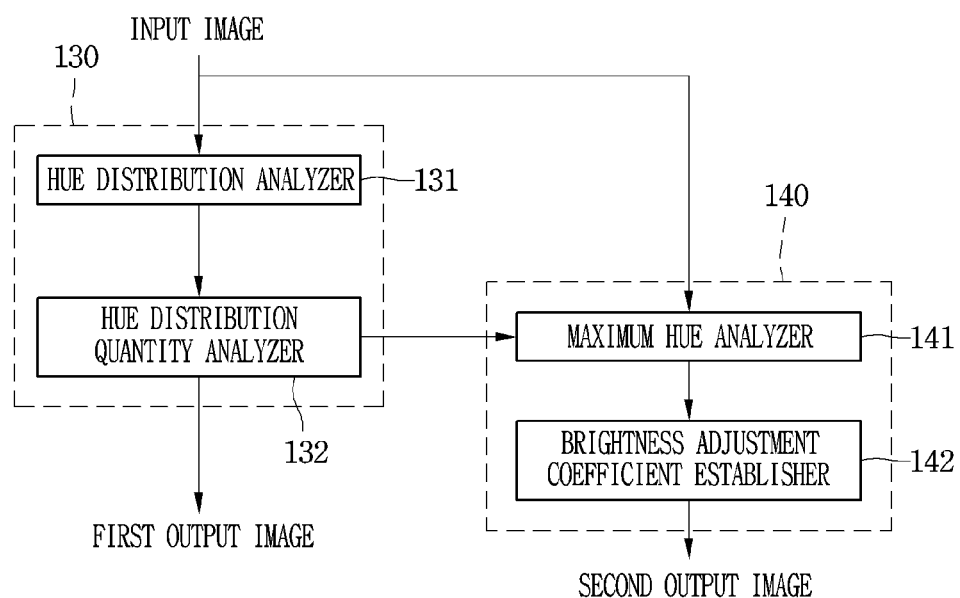
FIG. 4 is a detailed block diagram showing the color analysis portion and the brightness control portion of FIG. 3.

FIG. 4 is a detailed block diagram showing in detail the color analysis portion and the brightness adjustment portion in FIG. 3. Referring to FIG. 4, the color analysis portion 130 can include a hue distribution analyzer 131 and a hue distribution quantity analyzer 132. The brightness adjustment portion 140 can include a maximum hue analyzer 141 and a brightness adjustment coefficient establisher 142.

The hue distribution analyzer 131 can transform the RGB data signal into hue, saturation and intensity data signals to analyze the saturation of the input image. The hue distribution quantity analyzer 132 can determine on the basis of the analyzed saturation of the input image whether or not the input image includes pure color components.

In detail, the color distribution analysis portion 131 can transform the RGB data signals into HIS (hue, intensity and saturation) data signals. The HIS color model is based on (or derived from) the human color perception model. As such, the input image can be represented by the hue, saturation and intensity information.

The RGB data signals can be transformed in the hue, saturation and intensity as represented by equations (3) through (5).

$$I = \frac{R+G+B}{3} \quad \text{Equation (3)}$$

$$S = 1 - \frac{3}{R+G+B}\min(R, G, B) \quad \text{Equation (4)}$$

$$H = \cos^{-1}\frac{0.5 \times ((R-G)+(R-B))}{\sqrt{(R-G)^2+(R-B)(G-B)}} \quad \text{Equation (5)}$$

where R represents a digital value of a red color component for a pixel, G represents a digital value of a green color component for the pixel and B represents a digital value of a blue color component for the pixel.

Alternatively, the hue distribution analysis portion 131 can analyze the saturation S of the input image on the basis to the input RGB data signals. This results from the fact that the hue distribution analysis portion 131 can directly obtain the saturation S from the RGB data signals using an equation (6).

$$S = 1 - \frac{3}{R+G+B}\min(R, G, B) \quad \text{Equation (6)}$$

In other words, the hue distribution analyzer 131 can obtain the saturation S for each of the pixels (i.e., color pixels) of the input image using the equation 4 or 6. Also, the hue distribution analyzer 131 can compare the obtained saturation and a first reference value between 0 and 1. If the obtained saturation is larger than the first reference value, the hue distribution analyzer 131 can determine that the respective pixel (i.e., the respective color pixel) corresponds to a pure color pixel. The first reference value can be set to be a value of 0.878. Such a first reference value is set in consideration of error probability, but it is not limited to this. In other words, the first reference value can be varied along the error range or the error margin.

The hue distribution quantity analyzer 132 can determine on the basis of the analyzed result of the hue distribution analyzer 131 whether the number of pixels having the saturations of at least the first reference value is larger than a second reference value which is set through comparison with the total number of pixels on the input image. In other words, the hue distribution quantity analyzer 132 can obtain (or calculate) the ratio of the number of pixels, which have the saturations of at least the first reference value, with respect to the total number of pixels. The second reference value can, for example, be set to be 1% of the total pixel number of the input image. The second reference value can be differently set in consideration of the error range or the error margin.

If the number of pixels having the saturations of at least the first reference value is at least the second reference value, the hue distribution quantity analyzer 132 can determine that the input image includes pure color components. On the contrary, when the number of pixels having the saturations of at least the first reference value is smaller than the second reference value, the hue distribution quantity analyzer 132 can determine that the input image corresponds to a color composite image having a complex color distribution. When it is determined that the input image corresponds to the color composite image, the input image can be originally output without adjusting the brightness of the W data signal as a first output image. On the other hand, if it is determined that the input image includes pure color components of at least the ratio between the second reference value and the total number of pixels on the input image, the hue distribution quantity analyzer 132 can supply the brightness adjustment portion 140 with either the analyzed saturation information regarding all the pixels of the input image or hue information regarding the pixels, which have the saturations of at least the first reference value, among all the pixels of the input image, as the brightness control signal.

In other words, the color analysis portion 130 can input the RGBW data signals and analyze the saturation of the input image on the basis of the RGB data signals among the RGBW data signals. The analyzed result of the color analysis portion 130 can selectively enable the brightness adjustment portion 140 to adjust the brightness of the W data signal among the RGBW data signals.

On the basis of the saturation information or the hue information applied from the hue distribution quantity analyzer 132, the maximum hue analyzer 141 can group the pixels having the saturations of at least the first reference value according to hues. Also, the maximum hue analyzer 141 detects the hue of a group including a greatest number of pixels among the pixel groups. In other words, the maximum hue analyzer 141 can analyze the hue including a greatest number of pixels as a maximum hue.

The brightness adjustment coefficient establisher 142 of the brightness adjustment portion 140 can set the brightness adjustment coefficient differently according to whether the maximum hue corresponds to anyone of the hues. In other words, the brightness adjustment coefficient can be varied along the hues. The brightness adjustment coefficient enables the brightness of the W data signal for the respective pixel on the input image to be adjusted.

In other words, the brightness adjustment coefficient can be set differently on the basis of the hue information of the input image which is obtained by the equation (5). For example, the brightness adjustment coefficients for red, green, cyan, magenta and yellow hues can be set to have values different from one another.

In accordance therewith, a second output image including the RGB data signals and an adjusted W data signal can be output from the brightness adjustment portion 140.

Alternatively, the brightness adjustment coefficient for each hue can be arbitrarily varied without being fixed. For example, if the input image includes a pure yellow color as a pure color of the highest ratio, the brightness adjustment coefficient is set to significantly reduce white brightness. This results from the fact that a region of the pure yellow color is mainly emphasized. In other words, the pure yellow color region can be emphasized by significantly reducing white brightness. As another example, the input image can include a pure blue color and a pure white color. In this case, a region of the white color is mainly emphasized. As such, the variation of white brightness must be small. Therefore, the brightness adjustment coefficient can be set to slightly reduce the white brightness.

Also, the brightness adjustment coefficient can be set to decrease the degree of reduction of the white brightness for a pure color with a low brightness. In other words, if a pure color image has a relatively high brightness, the contrast ratio can increase by decreasing the white brightness in a relatively large reduction. On the contrary, when the pure color image has a relatively low brightness, deterioration of image quality can be prevented by decreasing the white brightness for a relatively small degree. Moreover, the brightness is gradually lowered in a color sequence of yellow, green, red and blue. As such, the brightness adjustment coefficient can be set to gradually decrease the degree of reduction of the white brightness in the color sequence. As such, the brightness adjustment coefficient can be lower in order to gradually increase the reduction width of the white brightness in the color sequence. And the brightness adjustment coefficient can be higher in order to gradually decrease the reduction width of the white brightness in the color sequence.

Method of Data Conversion

Figure 5:
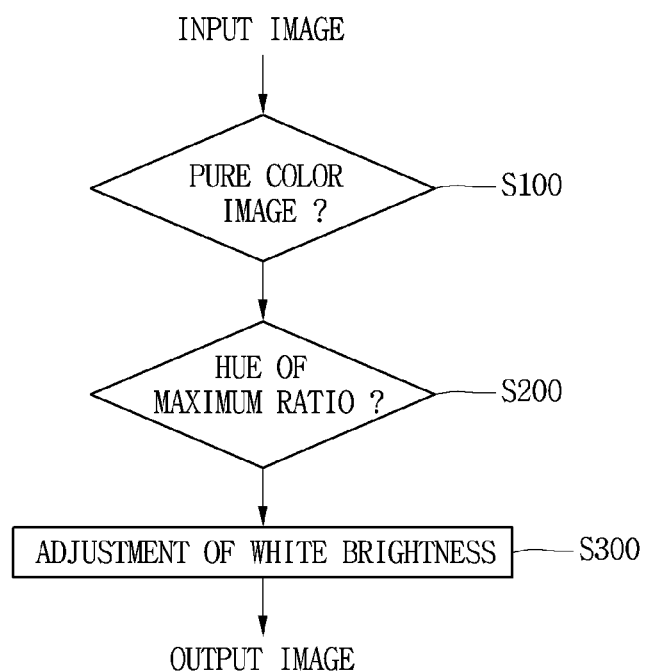
FIG. 5 is a flow chart illustrating a data conversion method according to an embodiment of the present disclosure.
Figure 6:
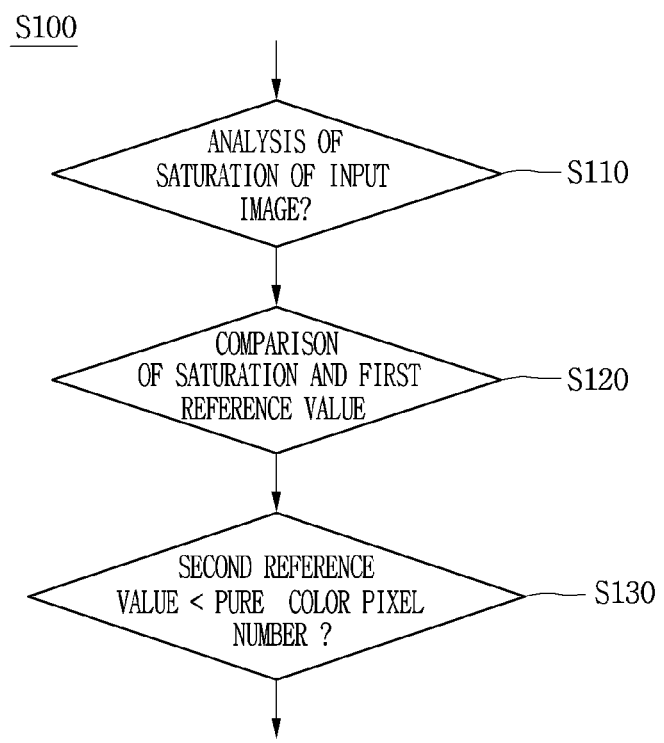
FIG. 6 is a detailed flowchart illustrating the first step of FIG. 5, according to an embodiment of the present disclosure.
Figure 7:
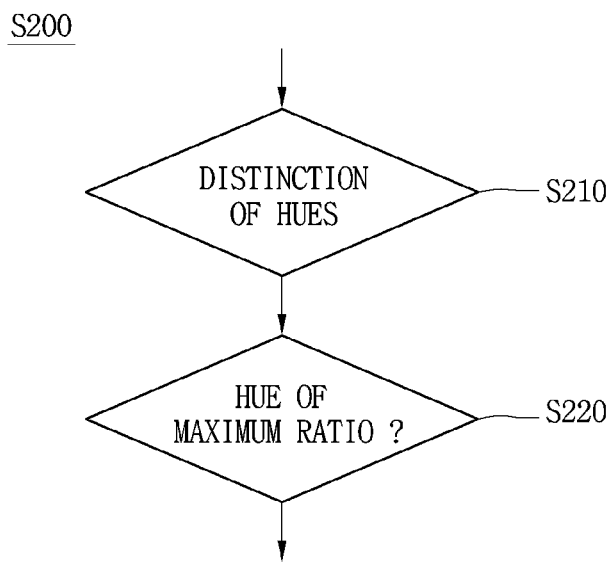
FIG. 7 is a detailed flowchart illustrating the second step in FIG. 5, according to an embodiment of the present disclosure.

FIG. 5 is a flow chart illustrating a data conversion method according to an embodiment of the present disclosure. FIG. 6 is a detailed flowchart illustrating the first step in FIG. 5. FIG. 7 is a detailed flowchart illustrating the second step in FIG. 5. Referring to FIGS. 5 through 7, the data conversion method sequentially performs first through third steps S100, S200 and S300.

The first step S100 is a step for determining whether or not an input image includes pure color components. In the first step S100, RGBW data signals for an image are input. Also, whether or not the input image includes the pure color components can be determined on the RGB data signals. The second step S200 corresponds to a step for detecting a hue with a maximum ratio. In the second step S200, the hue of a pure color component having the maximum ratio can be detected among the pure color components included in the input image. The third step S300 allows brightness of the W data signal to be adjusted according to the hue of the maximum ratio.

The first step S100 for determining the pure color image can include sub-steps S110, S120 and S130. The sub-step S110 allows saturation of each pixel of the input image to be analyzed. In the sub-step 120, it is determined whether or not the saturation of each pixel of the input image is at least a first reference value. Thereafter, in the sub-step S130, it is determined whether or not the number of pixels having the saturations of at least a first reference value is not smaller than a second reference value. The second step S200 for determining the hue of the maximum ratio can include sub-steps S210 and S220. In the sub-step S210, the hues of the pixels having the saturation of at least the first reference value are detected. Afterward, in the sub-step S220, the hue of the maximum ratio among the hues of the pixels having the saturations of at least the first reference value is detected.

As described above, the data conversion unit and method according to embodiments of the present disclosure can reduce the white brightness of a pure color image in consideration of high white brightness and low brightness of the pure color. Also, the data conversion unit and method can set the degree of reduction of the white brightness differently according to whether the pure color image includes any of the pure colors. As such, the contrast ratio of the pure color image can be enhanced. In detail, the data conversion unit and method can analyze the saturation of the input image, determine on the basis of the analyzed result whether or not the input image includes pure color components of at least a reference value, distinguish the pure color of the component of the highest ratio among the pure color components, and adjust the brightness of the input image by a degree of reduction which corresponds to the distinguished pure color. As such, the white brightness of the input image can be adjusted in consideration of brightness and perception properties of each pure color. Also, the white brightness of the input image can be differently adjusted according to pure colors. Accordingly, power consumption can be reduced and the contrast ration of the input image can be enhanced. Also, deterioration of image quality due to decreasing the white brightness of the pure color image in by a fixed degree of reduction regardless of the hue of the pure color can be prevented. Moreover, the data conversion unit and method can realize a high contrast ratio without increasing luminosity of a backlight.

Figure 8:
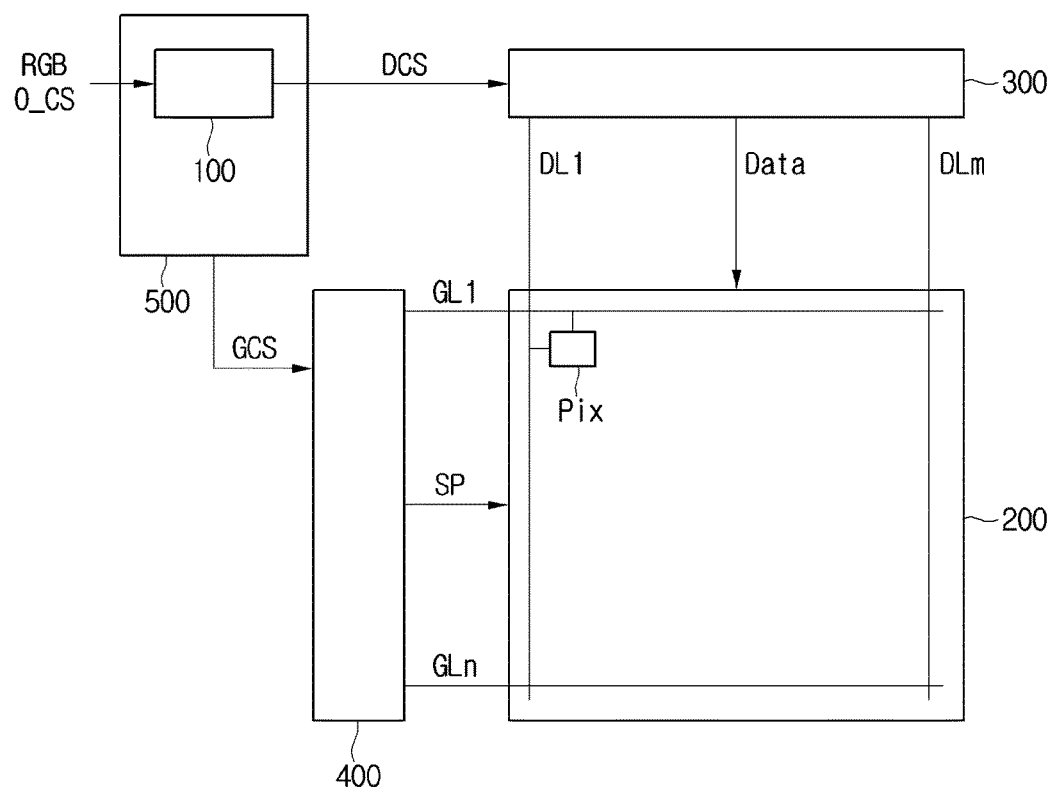
FIG. 8 is a block diagram showing a display device which includes a data conversion unit in accordance with an embodiment of the present disclosure.
Figure 9:
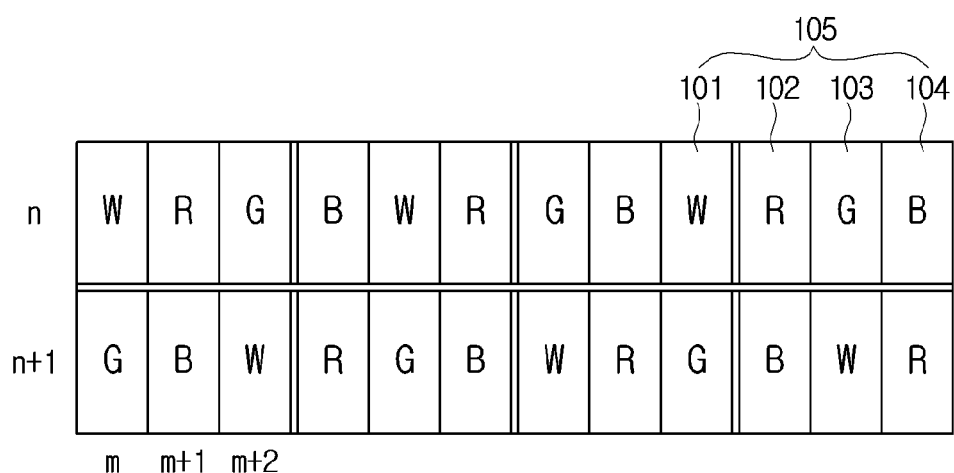
FIG. 9 is a planar view showing arrangement of sub-pixels according to an embodiment of the present disclosure.

FIG. 8 is a block diagram showing a display device with a data conversion unit according to an embodiment of the present disclosure. FIG. 9 is a planar view showing arrangement of sub-pixels. Referring to FIG. 8, the display device 600 according to an embodiment of the present disclosure can include a display panel 200, a data driver 300, a gate driver 400 and a timing controller 500. The timing controller 500 can include a data conversion unit 100. Alternatively, a data conversion unit 100 separate from the timing controller 500 can be included in the display device.

In other words, the data conversion unit 100 can be built into the timing controller 500, or separated from the timing controller 500. Although it is explained herein that the data conversion unit 100 is applied to the display device 600, in other embodiments, variations to such scheme is possible. Alternatively, the data conversion unit 100 can be applied to wireless communication devices such as mobile wireless handsets, display modules of digital and video cameras, digital multimedia players, personal digital assistants (PDAs), video game consoles, video display devices and exclusive viewing stations such as television receivers.

The display panel 200 includes a plurality of gate lines GL1 through GLn and a plurality of data lines DL1 through DLm. Also, the display panel 200 includes sub-pixels Pix formed in respective regions which is defined by the pluralities of gate lines GL1 through GLn and data lines DL1 through DLm.

The gate driver 400 replies to gate control signals GCS applied from the timing controller 500, and supplies a plurality of scan signals SP to the plurality of gate lines GL1 through GLn, respectively. The plurality of scan signals SP can sequentially enable the plurality of gate lines GL1 through GLn in one horizontal synchronous signal interval. Such a gate driver 400 can be configured with a plurality of gate Integrated circuit (IC) chips.

The data driver 300 can reply to data control signals DCS applied from the timing controller 500 and generate data voltages whenever anyone among the plurality of gate lines GL1 through GLn is enabled. The data voltages generated in the data driver 300 are applied to the plurality of data lines DL1 through DLm on the display panel 200.

The timing controller 500 can generate the gate control signals GCS and the data control signals DCS using a various control signals which are applied from an external system (not shown) such as a graphic module of a computer system or an image demodulation module of a television receiver. The gate control signals GCS are used to control the gate driver 400 and the data control signals DCS are used to control the data driver 300.

The sub-pixels Pix on the display panel 200 can be used to display R, G, B and W colors. The color sub-pixels can be arranged as shown in FIG. 8. In detail, the color sub-pixels can be repeatedly arranged on an odd-numbered horizontal line k in order of a W sub-pixel 101, an R sub-pixel 102, a G sub-pixel 103 and a B sub-pixel 104. Also, the color sub-pixels can be repeatedly arranged on an even-numbered horizontal line k+1 in order of a G sub-pixel 103, a B sub-pixel 104, a W sub-pixel 101 and an R sub-pixel 102. As such, the color sub-pixels on the odd-numbered horizontal line k and the respective (or same) color sub-pixels on the even-numbered horizontal line k+1 can be arranged along a vertical direction in a zigzag pattern not a line (or row). For example, two W sub-pixels 101 can be positioned at an intersection of a jth vertical line and the odd-numbered horizontal line k and another intersection of a (j+1)th vertical line and the even-numbered horizontal line k+1. In other words, one of two same color sub-pixels (i.e., two R, G, B or W sub-pixels), which are adjacently positioned in an odd-numbered horizontal line k and an even-numbered horizontal line k+1 adjacent thereto, is disposed on an arbitrary vertical line (for example, jth vertical line), and the other one is disposed on a different vertical line (for example, (j−2 or j+2)th vertical line) which is shifted from the arbitrary vertical line by two sub-pixels in a lateral direction. Such zigzaged sub-pixel arrangement, which allows same color sub-pixels on the odd-numbered line k and the even-numbered horizontal line k+1 to be shifted from each other by the distance (or length) of two sub-pixels, can prevent the appearance of straight lines unless linear sub-pixel arrangement allowing same color sub-pixels to be arranged in a vertical direction.

For example, a liquid crystal display (LCD) device can be used as the display panel 200. In this case, the sub-pixel Pix includes a thin film transistor TFT connected to one of the gate lines GL1 through GLn and one of the data lines DL1 through DLm and a pixel electrode connected to the thin film transistor. The thin film transistor TFT transfers a data voltage on one of the data lines DL1 through DLm to a liquid crystal cell (or the pixel electrode) in response to a scan signal SP from one of the gate lines GL1 through GLn. To this end, the thin film transistor TFT includes a gate electrode connected to one of the gate lines GL1 through GLn, a source electrode connected to one of the data lines DL1 through DLm, and a drain electrode connected to the pixel electrode of the liquid crystal cell. Also, a storage capacitor for maintaining the voltage of the liquid crystal cell is formed on a lower glass substrate of the display panel 200. Moreover, color filters and a black matrix can be formed on an upper glass substrate of the display panel 200. The color filter is formed at locations corresponding a pixel region in which the thin film transistor TFT is formed. The black matrix rims the color filters and shields the gate lines GL1 through GLN, the data lines DL1 through DLm, the thin film transistor and so one. Such color filters allow the sub-pixels to be distinguished in R, G, B and W sub-pixels. As such, the liquid crystal cells included in the R, G, B and W sub-pixels can be used to display R, G, B and W colors, respectively.

As another example of the display panel 200, an organic light emitting diode display panel can be used. In this case, the R, G, B and W sub-pixels can each include an organic light emitting diode. Such R, G, B and W sub-pixels can output respective color lights by emitting the respective organic light emitting diodes. As such, the organic light emitting diode display panel can display an image. The organic light emitting diode can be formed in either a structure including a hole transport layer, an organic emission layer and an electron transport layer or another structure including a hole injection layer, a hole transport layer, an organic emission layer, an electron transport layer and an electron injection layer. Moreover, a functional layer for enhancing light emission efficiency and life span of the organic emission layer can be additionally included in the organic light emitting diode.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents without being limited to the description of the present disclosure.

What is claimed is:

1. A data conversion unit in a display device comprising:
   a color analysis portion configured to determine presence of a pure color component in an input image by analyzing R (red), G (green) and B (blue) components of RGBW (red, green blue and white) data signal, wherein the input signal is included the RGBW data signal; and
   a brightness adjustment portion configured to adjust brightness of W (white) component in the RGBW data signal according to a hue of the pure color component present in the input image,
   wherein the color analysis portion includes a hue distribution analyzer configured to compare a saturation of each pixel of the input image obtained from the RGB data signals against a first reference value to determine the presence of the pure color component,
   wherein the color analysis portion further includes a hue distribution quantity analyzer configured to compare a number of pixels having the saturations of at least the first reference value against a second reference value, the hue distribution quantity analyzer determining that the input image includes the pure color component when the number of pixels having the saturation is at least the second reference value.

2. The data conversion unit of claim 1, wherein the color analysis portion is configured to determine that a pure color component is present when saturation for a pixel obtained by a following equation:

$$S = 1 - \frac{3}{R+G+B}\min(R, G, B)$$

where S represents saturation of the pixel, R represents a digital value of a red color component for the pixel, G represents a digital value of a green color component for the pixel and B represents a digital value of a blue color component for the pixel.

3. The data conversion unit of claim 1, wherein the brightness adjustment portion includes a hue analyzer configured to:
identify pixels having the saturation of at least the first reference value; classify the identified pixels according to hues; and
determine a hue with a largest number of pixels according to the classification.

4. The data conversion unit of claim 3, wherein the brightness adjustment portion further includes a brightness adjustment coefficient establisher configured to set a brightness adjustment coefficient for adjusting the brightness of a W component in the RGBW data in accordance with the determined hue.

5. A data conversion method comprising:
determining presence of a pure color component in an input image by analyzing R (red), G (green) and B (blue) components of RGBW (red, green blue and white) data signal, wherein the input signal is included the RGBW data signal;
determining a hue with a largest number of pixels that have the pure color component; and
adjusting brightness of W (white) components in the input image according to the determined hue,
wherein the determination the presence of the pure color component includes:
analyzing saturation for each pixel in the input image;
determining whether or not the saturation of each pixel is at least a first reference value; and
determining whether or not a number of pixels having the saturation of at least the first reference value is at least a second reference value.

6. The data conversion method of claim 5, wherein the determination the hue with the largest number includes:
identifying pixels having the saturation of at least the first reference value;
classifying the identified pixels according to hues; and
determining a hue with a largest number of pixels according to the classification.

7. The data conversion method of claim 6, further comprising:
setting a brightness adjustment coefficient for adjusting the brightness of a W component in the RGBW data in accordance with the determined hue.

8. The data conversion method of claim 5, wherein the saturation for a pixel is obtained by a following equation:

$$S = 1 - \frac{3}{R+G+B}\min(R, G, B)$$

where S represents saturation of the pixel, R represents a digital value of a red color component for the pixel, G represents a digital value of a green color component for the pixel and B represents a digital value of a blue color component for the pixel.

9. A non-transitory computer readable storage medium storing instructions thereon, the instructions when executed by a processor cause the processor to:
determine presence of a pure color component in an input image by analyzing R (red), G (green) and B (blue) components of RGBW (red, green blue and white) data signal,
wherein the input signal is included the RGBW data signal;
determine a hue with a largest number of pixels that have the pure color component; and
adjust brightness of W (white) components in the input image according to the determined hue,
wherein the instructions for determining the presence of the pure color component include instructions that cause the processor to:
analyze saturation for each pixel in the input image;
determine whether or not the saturation of each pixel is at least a first reference value; and
determine whether or not a number of pixels having the saturation of at least the first reference value is at least a second reference value.

10. The non-transitory computer readable storage medium of claim 9, wherein the instructions for determining the hue with the largest number include instructions that cause the processor to:
identify pixels having the saturation of at least the first reference value;
classify the identified pixels according to hues; and
determine a hue with a largest number of pixels according to the classification.

11. The non-transitory computer readable storage medium of claim 10, further comprising instructions to:
set a brightness adjustment coefficient for adjusting the brightness of a W component in the RGBW data in accordance with the determined hue.

12. The non-transitory computer readable storage medium of claim 9, wherein the saturation for a pixel is obtained by a following equation:

$$S = 1 - \frac{3}{R+G+B}\min(R, G, B)$$

where S represents saturation of the pixel, R represents a digital value of a red color component for the pixel, G represents a digital value of a green color component for the pixel and B represents a digital value of a blue color component for the pixel.

* * * * *